United States Patent
Fukuhara

(10) Patent No.: US 9,595,740 B2
(45) Date of Patent: Mar. 14, 2017

(54) SECONDARY-BATTERY SYSTEM AND SECONDARY-BATTERY-FAILURE-DETECTION SYSTEM

(71) Applicant: NGK Insulators, Ltd., Nagoya (JP)

(72) Inventor: Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 268 days.

(21) Appl. No.: 14/564,473

(22) Filed: Dec. 9, 2014

(65) Prior Publication Data

US 2015/0093614 A1 Apr. 2, 2015

Related U.S. Application Data

(63) Continuation of application No. PCT/JP2013/056850, filed on Mar. 12, 2013.

(30) Foreign Application Priority Data

Jun. 15, 2012 (JP) .................................. 2012-136199

(51) Int. Cl.
| | |
|---|---|
| *H01M 10/48* | (2006.01) |
| *H01M 10/42* | (2006.01) |
| *H01M 2/12* | (2006.01) |
| H01M 2/10 | (2006.01) |
| H01M 10/39 | (2006.01) |

(52) U.S. Cl.
CPC ..... *H01M 10/4228* (2013.01); *H01M 2/1223* (2013.01); *H01M 10/482* (2013.01); *H01M 2/1016* (2013.01); *H01M 10/3909* (2013.01)

(58) Field of Classification Search
CPC ........... H01M 10/4228; H01M 10/482; H01M 10/3909; H01M 2/1223; H01M 2/1016
See application file for complete search history.

(56) References Cited

U.S. PATENT DOCUMENTS

| | | | |
|---|---|---|---|
| 2,932,739 | A | 4/1960 | Kummer et al. |
| 3,366,456 | A | 1/1968 | Andreatch et al. |

(Continued)

FOREIGN PATENT DOCUMENTS

| | | |
|---|---|---|
| JP | 58-178240 A1 | 10/1983 |
| JP | 03-158781 A1 | 7/1991 |
| JP | 06-104007 A1 | 4/1994 |

OTHER PUBLICATIONS

Partial European Search Report (Application No. 13803708.0) dated Jan. 7, 2016.

(Continued)

*Primary Examiner* — Raymond Alejandro
(74) *Attorney, Agent, or Firm* — Burr & Brown, PLLC

(57) ABSTRACT

A secondary battery system and a secondary battery failure detection system includes a monitoring unit, a main gas pipe, a plurality of auxiliary gas pipes, and a plurality of solenoid valves provided in correspondence with the respective auxiliary gas pipes. The monitoring unit includes a pump for sucking a gas supplied into the main gas pipe, an active material detection sensor for detecting active material contained in the gas, a failure module identification unit for identifying a module having a failure based on an output from the active material detection sensor, and a sequence controller for performing opening/closing operation of the solenoid valves in accordance with a predetermined sequence.

18 Claims, 12 Drawing Sheets

(56) References Cited

U.S. PATENT DOCUMENTS

| | | | | |
|---|---|---|---|---|
| 3,714,421 | A | 1/1973 | Josias et al. | |
| 2003/0008203 | A1* | 1/2003 | Winter | H01M 2/38 |
| | | | | 429/81 |
| 2007/0229294 | A1* | 10/2007 | Vossmeyer | H01M 10/4207 |
| | | | | 340/636.19 |
| 2010/0259276 | A1* | 10/2010 | Streit | G01R 31/362 |
| | | | | 324/525 |
| 2012/0229142 | A1* | 9/2012 | Yang | G01R 31/36 |
| | | | | 324/426 |
| 2012/0299599 | A1* | 11/2012 | Naruse | B60L 3/0069 |
| | | | | 324/509 |

OTHER PUBLICATIONS

International Search Report and Written Opinion (Application No. PCT/JP2013/056850) dated Jun. 18, 2013.

* cited by examiner

SECONDARY-BATTERY SYSTEM AND SECONDARY-BATTERY-FAILURE-DETECTION SYSTEM

CROSS-REFERENCE TO RELATED APPLICATIONS

This application is a Continuation of International Application No. PCT/JP2013/056850 filed on Mar. 12, 2013, which is based upon and claims the benefit of priority from Japanese Patent Application No. 2012-136199 filed on Jun. 15, 2012, the contents all of which are incorporated herein by reference.

TECHNICAL FIELD

The present invention relates to a secondary battery system and a secondary battery failure detection system for identifying a module having leakage of at least active material, among the two or more modules each including a large number of secondary batteries and a casing containing the secondary batteries.

BACKGROUND ART

In general, frequency adjustment in an electric power system and adjustment of power demands and power supplies in the electric power system are carried out using a plurality of power generators, storage batteries, etc., equipped in the electric power system. Further, in most cases, adjustment in the difference between the generated electric power from natural energy based power generators and its planned output electric power, and reduction in the changes of electric power generated by the natural energy based power generators are also performed using the power generators, storage batteries, etc. In comparison with general electric power generators, the storage batteries can change the electric power output at high speed, and can be used effectively in frequency adjustment of the electric power system, adjustment of the difference between the generated electric power from natural energy based power generators and its planned output electric power, and adjustment of power demands and power supplies in the electric power system.

In this regard, as a storage battery operated at high temperature connected to the electric power system, a sodium-sulfur battery (hereinafter referred to as the NaS battery) is used, for example. This NaS battery is a high temperature secondary battery containing metal sodium and sulfur as active materials in an isolated manner using a solid electrolyte tube. When the NaS battery is heated at high temperature of about 300° C., a certain amount of energy is produced by an electrochemical reaction of both of the melted active materials of these metal sodium and sulfur. Normally, the NaS battery is formed by assembling a plurality of battery cells upright, and used in a form of a module including a plurality of battery cells connected together. That is, the module has structure where circuits (strings) each formed by connecting a plurality of battery cells in series are connected in parallel to form a block, and at least two blocks are connected in series, and placed in a heat insulating container.

As a method of detecting a failure in the module of this type, a method of detecting a failure in a battery by comparing the depth of discharge in each block is disclosed (e.g., see Japanese Laid-Open Patent Publication No. 03-158781). In this method, the presence of the failure in the battery is considered for each of the blocks of the module. Therefore, in comparison with the method of detecting a failure in each of NaS battery cells forming the block, the apparatus is not complicated, and the production cost is reduced. In these respects, this failure detection method is advantageous.

SUMMARY OF INVENTION

It is considered that failures in the battery cells, and consequently, failures in the modules are caused by an internal short circuiting or external short circuiting in the battery cells.

For example, the external short circuiting of the battery cells may be caused by formation of an external short circuiting loop due to leakage of active material in the battery cells. For example, the internal short circuiting of the battery cells may be caused by damages, etc. of a beta tube.

The external short circuiting and internal short circuiting of these battery cells can be detected by checking the above described voltage changes in each block. However, the voltage changes due to the short circuiting do not occur rapidly, but occur gradually over a relatively long period of time. Therefore, if the detection accuracy is low, initial response to the occurrence of the failure may be delayed undesirably. In an attempt to address the problem, it may be possible to improve the accuracy of detecting the voltage changes. Further, it is desired to propose a different scheme which is different from the scheme of detecting the voltage changes for detecting failures.

The present invention has been made to take the problems of this type into account, and an object of the present invention is to provide a secondary battery system and a secondary battery failure detection system which make it possible to identify a module having leakage of active material easily by collecting a gas (atmosphere) in a casing from each of a plurality of modules and detecting the active material contained in the gas.

[1] According to a first aspect of the present invention, secondary battery system includes two or more modules including a large number of battery cells as secondary batteries and a casing containing the battery cells, a monitoring unit configured to identify a module having leakage of at least active material, among the two or more modules, a main gas pipe provided between the two or more modules and the monitoring unit, a plurality of auxiliary gas pipes provided in correspondence with the modules, and a plurality of solenoid valves provided in correspondence with the auxiliary gas pipes. At least one of the auxiliary gas pipes is attached to each of the modules, and the solenoid valves are configured to be opened/closed for connection/disconnection between the corresponding auxiliary gas pipes and the main gas pipe. The monitoring unit includes a pump connected to the main gas pipe and configured to suck a gas supplied into the main gas pipe from the auxiliary gas pipe, into the monitoring unit, an active material detection sensor configured to detect active material contained in a gas flowing through the main gas pipe, a failure module identification unit configured to identify a module having leakage of active material based on an output from the active material detection sensor, and a sequence controller configured to perform opening/closing operation of the plurality of solenoid valves in accordance with a predetermined sequence.

Further, the sequence controller opens/closes the solenoid valves in accordance with a predetermined sequence. Thus, the gas (atmosphere) in each casing of the modules flows into the main gas pipe through the auxiliary gas pipes and the solenoid valves. The gas supplied into the main gas pipe is sucked into the monitoring unit by the pump. The active material detection sensor detects the active material contained in the gas flowing through the main gas pipe. Then, the failure module identification unit identifies a module having leakage of active material based on an output from the active material detection sensor.

That is, in the system according to the present invention, in a scheme which is different from the scheme of detecting the voltage changes, the gas (atmosphere) in the casing is collected from each of the modules, and active material contained in the gas is detected. In this manner, it is possible to easily identify a module having leakage of active material.

[2] In the first aspect of the present invention, the sequence controller may open the plurality of solenoid valves by turns such that each of the solenoid valves is opened for a fixed period for allowing the gas from different auxiliary gas pipes to be supplied into the main gas pipe by turns, respectively, and the failure module identification unit may sample the output from the active material detection sensor to obtain a detection value for each of the auxiliary gas pipes, based on switch timing of opening operation of the solenoid valves.

[3] In this case, when the failure module identification unit detects that the sampled detection value is equal to or greater than a gas discharge request setting value requiring gas discharge, or when the failure module identification unit determines a mean value sequentially from detection values of historical sampling and detects that the mean value is equal to or greater than $+1\sigma$, which is standard deviation, the sequence controller may perform the steps of (1) suspending operation of opening the solenoid valves by turns and closing all of the solenoid valves;

(2) supplying a reference gas into the main gas pipe to discharge the gas in the main gas pipe; and (3) resuming operation of opening the solenoid valves by turns.

[4] Further, the failure module identification unit may identifies a module having attached thereto an auxiliary gas pipe corresponding to a detection value equal to or greater than a predetermined specified value, among detection values corresponding to all of the auxiliary gas pipes, as a module having leakage of active material.

[5] Alternatively, the failure module identification unit may extract one detection value from detection values corresponding to all of the auxiliary gas pipes, compare the extracted detection value with the other detection values to calculate deviation, and if the deviation falls out of a predetermined range, identify modules having attached thereto auxiliary gas pipes corresponding to high detection values, among the compared detection values, as modules having leakage of active material by turns.

[6] Further, it is preferable that the fixed period includes a period in which at least two of the solenoid valves are both opened.

[7] Preferably, the monitoring unit includes a drain tank configured to remove at least water content from the gas flowing through the main gas pipe.

[8] In the first aspect of the present invention, preferably, two or more module strings each formed by connecting a predetermined number of the modules in series are provided, a valve station is provided in correspondence with each of the module strings, and the valve station has a number of the solenoid valves corresponding to the predetermined number, and the sequence controller may include a main control unit provided for the monitoring unit, and a remote control unit provided in correspondence with each of the module strings, and configured to control the solenoid valves of the valve station, based on an instruction signal from the main control unit.

[9] Further, two auxiliary gas pipes may be attached to each of the modules.

[10] The casing of the module may include a box body containing a large number of the battery cells and a lid body covering an opening on an upper surface of the box body, and two auxiliary gas pipes may run outward from base points provided at bottom of the box body, and spaced from each other in the box body, such that the battery structural body made up of a large number of the battery cells placed in the box body is located between the base points.

[11] The module may be formed by connecting two or more blocks in series, each of the blocks may be formed by connecting two or more circuits in parallel, and each of the circuits may be formed by connecting two or more battery cells in series.

[12] In the first aspect of the present invention, a block identification unit may be provided in correspondence with each of the modules. The block identification unit may detect open circuit voltage values of all of the blocks in the corresponding module at end of electric discharging, and identify a block having a failure based on the detected open circuit voltage values, and among the modules, the failure module identification unit may identify a module including the block having the failure, as a module having leakage of active material.

[13] Alternatively, the secondary battery system may include two or more module strings each formed by connecting a predetermined number of the modules in series and a block identification unit provided in correspondence with each of the module strings. The block identification unit may detect open circuit voltage values of all of the blocks in the corresponding module string values at end of electric discharging, and identify a block having a failure based on the detected open circuit voltage values. Among the modules, the failure module identification unit may identify a module including the block having the failure, as a module having leakage of active material.

[14] In this case, the block identification unit may identify a block corresponding to an open circuit voltage value equal to or less than a predetermined specified voltage value, as a block having a failure.

[15] Alternatively, the block identification unit may extract one open circuit voltage value from the detected open circuit voltage values, compares the extracted open circuit voltage value with the other open circuit voltage values to calculate deviation, and when the deviation falls out of a predetermined range, identifies blocks corresponding to low voltage values, among the compared voltage values, as blocks having failures by turns.

[16] According to a second aspect of the present invention, a secondary battery failure detection system includes a monitoring unit configured to identify a module having leakage of at least active material, among two or more modules each including a large number of battery cells as secondary batteries and a casing containing the battery cells, a main gas pipe provided between the two or more modules and the monitoring unit, a plurality of auxiliary gas pipes provided in correspondence with the modules, and a plurality of solenoid valves provided in correspondence with the auxiliary gas pipes. At least one auxiliary gas pipe is attached to each of the modules. The solenoid valves are configured to be opened/closed for connection/disconnection between the corresponding auxiliary gas pipes and the main gas pipe. The monitoring unit includes a pump connected to the main gas pipe and configured to suck a gas supplied into the main gas pipe from the auxiliary gas pipe, into the monitoring unit, an active material detection sensor configured to detect active material contained in a gas flowing through the main gas pipe, a failure module identification unit configured to identify a module having leakage of active material based on an output from the active material detection sensor, and a sequence controller configured to perform opening/closing operation of the solenoid valves in accordance with a predetermined sequence.

As described above, in the secondary battery system and the secondary battery failure detection system according to the present invention, the gas (atmosphere) in the casings is collected from the modules to detect active material in the gas. In this manner, it is possible to easily identify the module having leakage of active material.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Hereinafter, embodiments of a secondary battery system and a secondary battery failure detection system according to the present invention, e.g., applied to a NaS battery will be described with reference to FIGS. 1 to 12.

Figure 1:
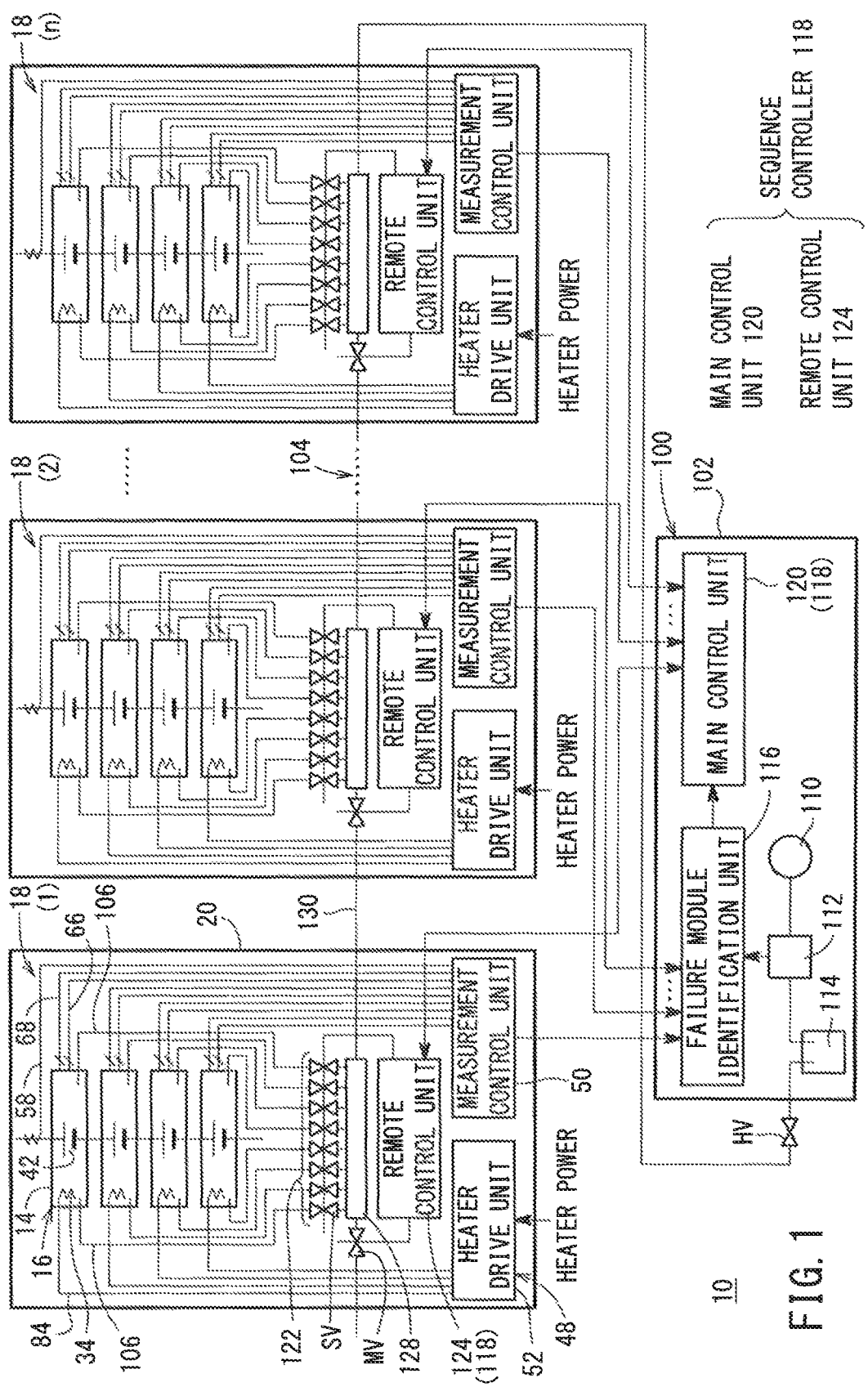
FIG. 1 is a diagram showing structure of a secondary battery system and a secondary battery failure detection system according to an embodiment of the present invention.

Firstly, as shown in FIG. 1, a secondary battery system 10 according to the present embodiment includes two or more modules 16 each comprising a large number of battery cells 12 as secondary batteries (see FIG. 2) and a casing 14 containing the battery cells 12. Specifically, in the present embodiment, two or more modules strings 18 are provided, and each of the module strings 18 comprises a predetermined number (four, in an example of FIG. 1) of the modules 16 connected in series. The module strings 18 are placed on corresponding frames 20, respectively.

Next, structure of the module 16, in particular, structure of the casing 14 will be described with reference to FIGS. 2A and FIG. 2B.

The casing 14 is a heat insulating container, and includes a box body 22 having an opening on its upper surface and a lid body 24 having an opening on its lower surface.

The box body 22 is formed of a plate member of, e.g., stainless steel, and formed in a box shape having a hollow area. The hollow area is a space sealed in an air-tight manner. The hollow area is configured to be connectable to an external space through a vacuum valve (not shown). A porous vacuum heat insulating board 26 formed by solidifying glass fiber in a plate shape using adhesive fills the hollow area to provide vacuum heat insulating structure for the box body 22.

In the same manner as in the case of the box body 22, the lid body 24 is formed of a plate member of, e.g., stainless steel. A heat insulating material layer 27 for achieving the required minimum heat insulating property (see FIG. 3) is placed on an inner surface (lower surface) of the lid body 24, and at least two stacked detachable heat insulating plates 30 are filled in a hollow area 28 to provide air heat insulating structure only in the lid body 24 (upper surface). In the structure, the amount of heat radiation from the upper surface of the casing 14 can be controlled.

Figure 3:
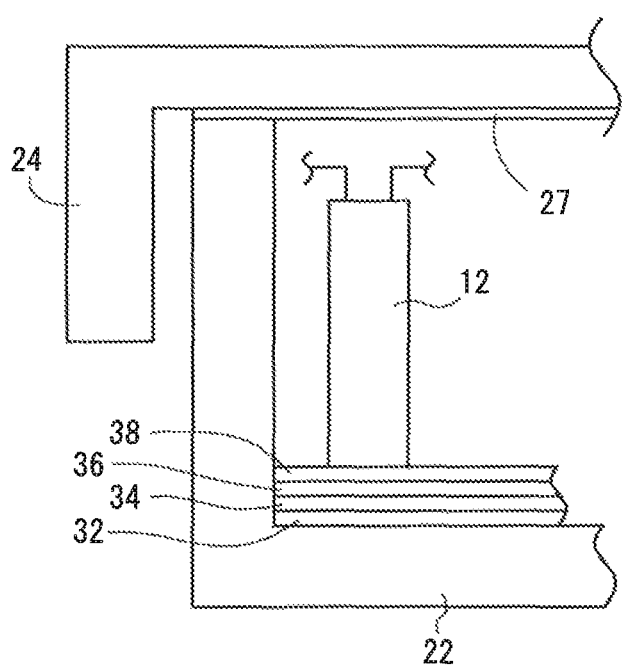
FIG. 3 is a cross sectional view showing an enlarged part of the module shown in FIG. 2A.

As shown in FIG. 3, a buffer member 32, a heater 34, a reinforcement plate 36, a mica sheet 38 for electrical insulation are stacked together, and placed on a bottom surface inside the box body 22. The heater 34 is also placed on one side surface of the box body 22.

One battery structural body 42 formed by a large number of battery cells 12 is placed upright in an internal space 40 of the casing 14 formed by the box body 22 and the lid body 24. In order to suppress damages and abnormal heating of the battery cells 12 or leakage of active material, etc., though not shown, as fire extinction sand, silica sand fills a gap between the box body 22 and the battery structural body 42.

Figure 4:
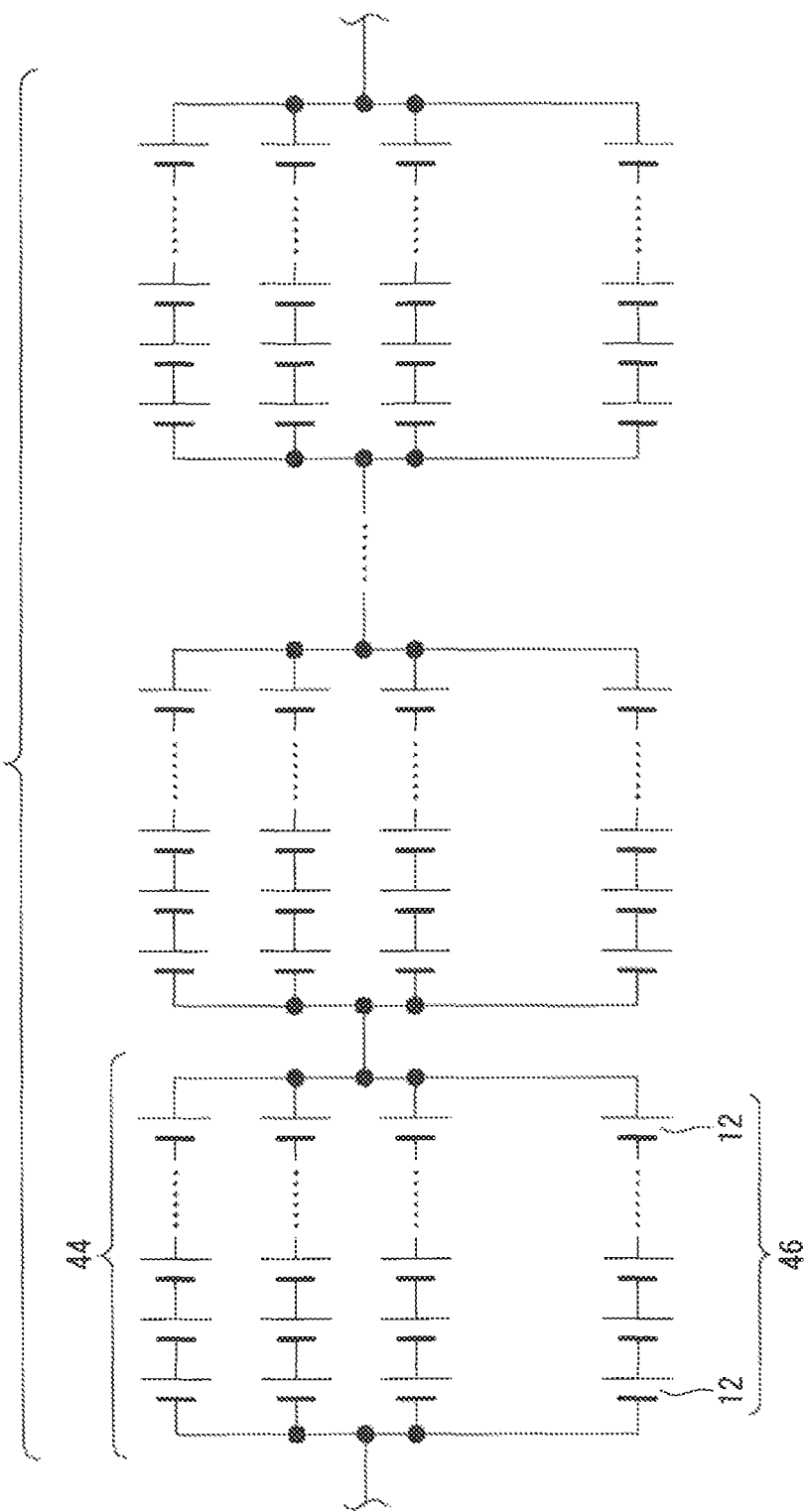
FIG. 4 is an equivalent circuit diagram showing a battery structural body included in the module.

As shown in FIG. 4, the battery structural body 42 is formed by connecting two or more blocks 44 in series. Each of blocks 44 is formed by connecting two or more circuits (strings 46) in parallel, and each of the strings 46 is formed by connecting two or more battery cells 12 in series. For example, eight battery cells 12 are connected in series to form one string 46, and twelve strings 46 are connected in parallel to form one block 44, and four blocks 44 are connected in series to form one battery structural body 42.

Figure 5:
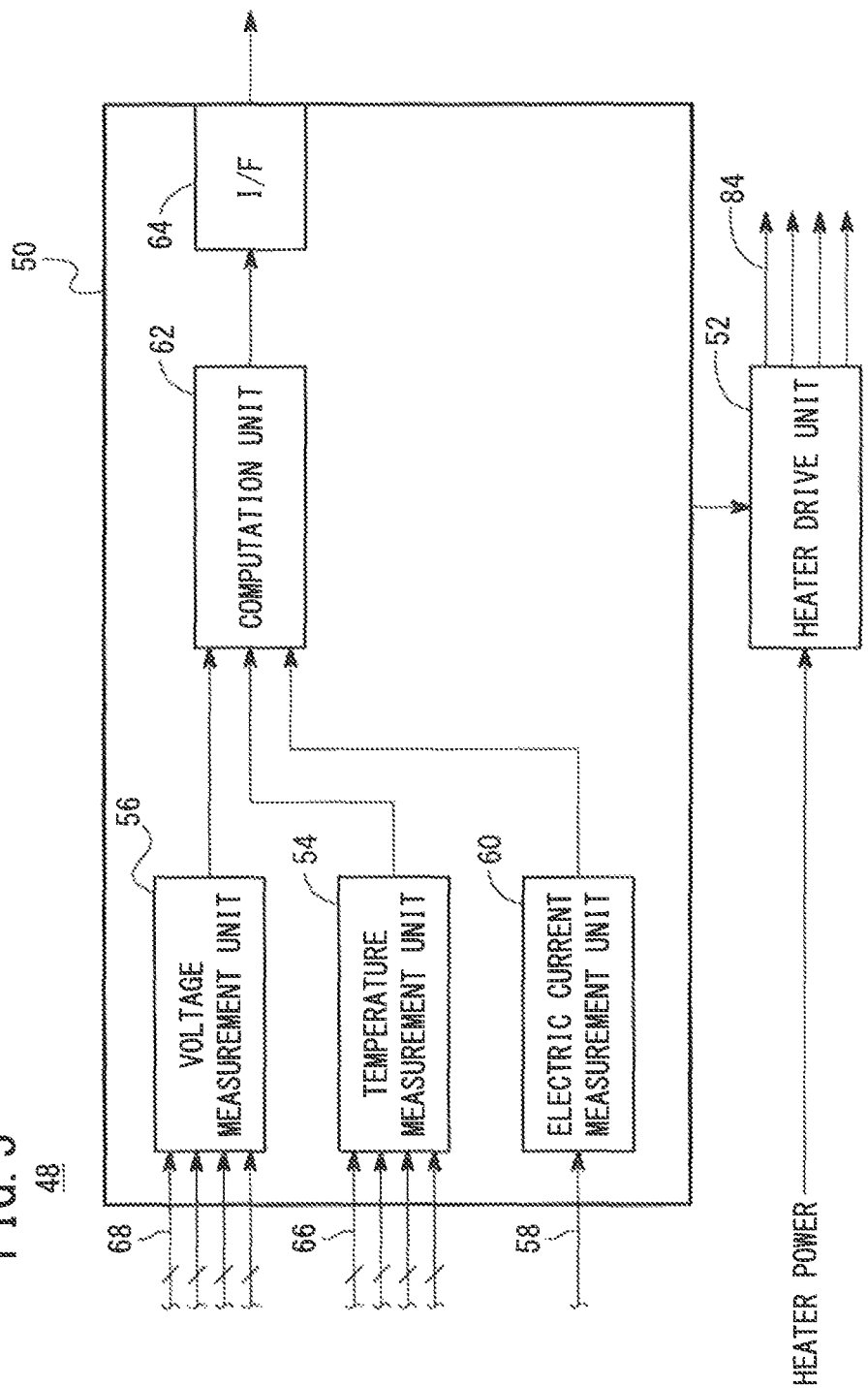
FIG. 5 is a block diagram showing structure of a control device.

Further, as shown in FIG. 1, control devices 48 are provided in correspondence with the respective module strings 18. Each of the control devices 48 is placed in a frame 20, and as main components, includes a measurement control unit 50 and a heater drive unit 52. As shown in FIG. 5, the measurement control unit 50 includes a temperature measurement unit 54 for measuring the operating temperature T and a voltage measurement unit 56 for measuring the operating voltage V for each module 16, an electric current measurement unit 60 for measuring the electric current of the module string 18 formed by connecting the plurality of modules 16 in series through an electric current measurement line 58, a computation unit 62 for determining the discharge cut off voltage, the charge cut off voltage, etc., based on measurement results from the temperature measurement unit 54, the voltage measurement unit 56, and the electric current measurement unit 60, and an interface 64 for sending signals to and receiving signals from the outside.

The temperature measurement unit 54 measures the operating temperature T of each of the modules 16 based on detection values sent through temperature measurement lines 66 from temperature sensors (not shown) provided for the modules 16, respectively. For example, the temperature sensors use thermocouples, or utilize changes in the electric resistance due to the temperature. Preferably, the temperature measurement unit 54 can measure temperatures of portions corresponding to the heater 34 for each of the modules 16. Specifically, in the case where the heater 34 includes a bottom surface heater and a side surface heater for each of the modules 16, it is preferable that the temperature of the bottom surface part and the temperature of the side surface part of each module 16 can be measured by the bottom surface sensor and the side surface heater, respectively. In an example shown in FIGS. 1 and 5, though one temperature measurement line 66 is provided for each of the modules 16, in the case where a plurality of temperature sensors are provided for each of the modules 16, a plurality of temperature measurement lines 66 are provided for each of the modules 16.

Preferably, the voltage measurement unit 56 can measure the voltage for each of the blocks 44 in the module 16. This is aimed to perform measurement accurately, and to reliably prevent excessive electric charging and excessive electric discharging.

Figure 6:
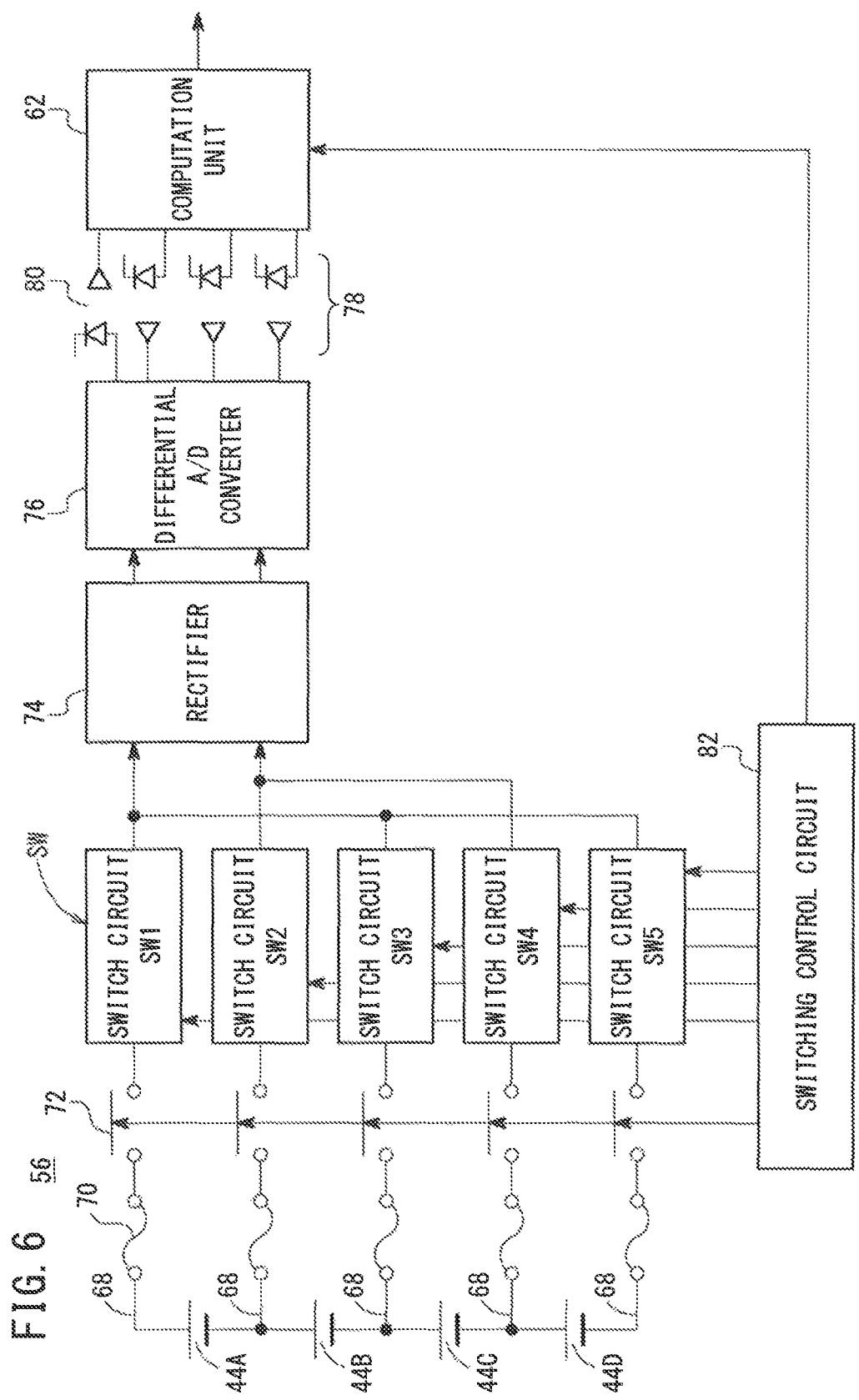
FIG. 6 is a circuit diagram showing structure of a voltage measurement unit of the control device.

An example of circuit structure corresponding to one module will be explained as circuit structure of the voltage measurement unit 56. As shown in FIG. 6, the circuit structure includes five voltage measurement lines 68 including two voltage measurement lines 68 connected to both ends (one end and the other end) of four blocks 44 (first block 44A to fourth block 44D) connected in series and three voltage measurement lines 68 connected to nodes between the blocks 44, fuses 70 connected in series with the corresponding voltage measurement lines 68, relays 72 which are turned on in conjunction with measurement of the voltage, switch circuits SW (first switch circuit SW1 to fifth switch circuit SW5) for selecting a signal line for each block, a rectifier 74 for rectifying a signal supplied for each block to convert the signal into a voltage signal of substantially direct electric current, a differential A/D converter 76 for converting the voltage signal from the rectifier 74 into, e.g., a 12-bit digital signal (voltage signal for each block), a digital signal photo-coupler array 78 for transmitting the digital signal from the differential A/D converter 76 to the computation unit 62 while maintaining predetermined withstand voltage, a sign bit photo-coupler 80, and a switching control circuit 82 for performing ON/OFF control of the relays 72 and the switch circuits SW to output a signal corresponding to switch timing of the switch circuits SW, to the computation unit 62. For example, each of the switch circuits SW may comprise a metal oxide semiconductor field-effect transistor for power having internal avalanche diodes connected in anti-parallel to each other.

For example, in the case of sending voltage values of the first block 44A to the fourth block 44D to the computation unit 62 by turns, firstly, the relay 72 is turned on, and then, both of the first switch circuit SW1 and the second switch circuit SW2 are turned on. This switch timing is transmitted to the computation unit 62, and a signal indicating a "positive" sign bit is transmitted from the computation unit 62 to the A/D converter 76 through the photo-coupler 80. When the first switch circuit SW1 and the second switch circuit SW2 are turned on, the voltage applied between both terminals of the first block 44A is supplied to the A/D converter 76 through the rectifier 74, and directly converted into a digital signal. The digital signal is transmitted to the computation unit 62 through the photo-coupler array 78.

Thereafter, while maintaining the ON state of the second switch circuit SW2, the first switch circuit SW1 is turned off, and the third switch circuit SW3 is turned on. This switch timing is transmitted to the computation unit 62. Then, a signal indicating a "negative" sign bit is transmitted from the computation unit 62 to the A/D converter 76 through the photo-coupler 80 this time. Since the second switch circuit SW2 and the third switch circuit SW3 are turned on, this time, the voltage applied between both terminals of a second block 44B is supplied to the A/D converter 76 through the rectifier 74, and converted into a digital signal. Then, the sign is inverted (converted into a positive voltage value), and the resulting signal is transmitted to the computation unit 62 through the photo-coupler array 78. Then, in the same manner, the voltage applied to both terminals of the third block 44C, and the voltage applied to both terminals of the fourth block 44D are converted into digital signals, respectively, and the digital signals are transmitted to the computation unit 62.

In the circuit structure shown in FIG. 6, for the brevity of explanation, the circuit structure corresponds to one module 16. As in the case of the present embodiment, in the case where one module string 18 comprising two or more modules 16 connected in series should be used, the numbers of the fuses 70, the relays 72, and the switching circuits SW are equal to the number calculated by multiplying the number of the modules 16 included in one module string 18 by the number of blocks 44 included in one module 16. Also, the fuses 70, the relays 72, and the switching circuits SW should be connected respectively to implement ON/OFF control of the relays 72 for each module, and to implement ON/OFF control of the switch circuits SW for each block.

Also in the temperature measurement unit 54 as described above, it is preferable to connect the A/D converter 76, the photo-coupler array 78, etc. as in the case of the voltage measurement unit 56.

As shown in FIGS. 1 and 5, the heater drive unit 52 includes a relay comprising, e.g., a semiconductor element having the sufficient capacity enough to withstand the electrical current flowing through the heater 34 (load), normally at the degree of several kW. Using the relay, the heater drive unit 52 is configured to be connected to/disconnected from heater power supply lines 84 to supply the heater power/stop supply of the heater power to the heater 34. It is preferable to provide a fuse in series with the relay for protection of devices and electric cables in the event of short-circuit in the heater.

In the measurement control unit 50, measurement values (data) of the temperature, voltage, and electric current measured by the temperature measurement unit 54, the voltage measurement unit 56, and the electric current measurement unit 60 are supplied to the computation unit 62, and sent to, e.g., a remote monitoring device through the interface 64 and the external cable (including the network).

At the time of electric discharging, based on the operating temperature T measured by the temperature measurement unit 54 and the discharging current $I_d$ measured by the electric current measurement unit 60, the internal resistance R of the module, the temperature coefficient $K_t$ (subject to change depending on the operating temperature T), the computation unit 62 calculates the discharge cut off voltage $V_L$ using the following equation (1) for comparison with the operating voltage V measured by the voltage measurement unit 56.

$$V_L = V_o \times n - I_d \times R \times K_t \tag{1}$$

where $V_o$ denotes open circuit voltage of the battery cell 12 immediately before shortage of sodium occurs at the cathode ($V_o$ is approximately 1.82 V), and n denotes the number of battery cells 12 included in the block 44.

Then, after the following relational inequality (2) is satisfied, it is determined that electric discharging has been completed (end of electric discharging), and electric discharging of the battery cells 12 is finished.

$$V_L > V \tag{2}$$

Further, at the time of electric charging, based on the charging current $I_c$ measured by the electric current measurement unit 60 and the internal resistance R of the module, charge cut off voltage $V_H$ is determined from the following computation equation (3) for comparison with the operating voltage V measured by the voltage measurement unit 56.

$$V_H = (V_f + \alpha) \times n - I_c \times R \tag{3}$$

where $V_f$ denotes open circuit voltage of the battery cell 12 at the end of electric charging ($V_f$ is approximately 2.075V, n denotes the number of the battery cells 12 included in the block 44, and α denotes polarization resistance produced at the end of electric charging (α is approximately 0.05 to 0.15 V). That is, the cut off voltage $V_H$ is calculated considering the polarization resistance based on the theoretical open circuit voltage at the end of electric charging as the NaS battery.

Then, after the following relational inequality (4) is satisfied, it is determined that electric charging has been completed (end of electric charging), and electric charging of the battery cells 12 is finished.

$$V_H < V \tag{4}$$

Determination to prohibit or stop electric charging or electric discharging is made based on the measurement values of the measured temperature, voltage, and electric current to operate the NaS battery further reliably.

The measurement control unit 50 outputs a heater control signal to the heater drive unit 52 for each heater, in accordance with predetermined time schedules stored, e.g., in the computation unit 62.

The heater drive unit 52 implements ON/OFF control of the heaters 34 by supplying heater power or stopping supply of heater power to the heaters 34 through the heater power supply lines 84, in accordance with a heater control signal (e.g., contact signal) received from the measurement control unit 50. In this example, though not shown, the heater 34 is made up of a bottom surface heater and a side surface heater which can be controlled independently from each other, and provided for each module 16.

Each of the bottom surface heaters and each of the side surface heaters repeat cycles including an ON period and an OFF period having the same length with a phase shift ⅙ cycle. By this heater control, the operating temperature of the NaS battery is kept within a desired temperature range, and consumed electrical energy is substantially balanced between two lines of the three-phase three-wire system alternating current power supply.

The measurement values of the operating temperature, the operating voltage, the discharging electric current, etc. measured by the respective measurement units, a signal indicating the state (completion of electric discharging, etc.) of the NaS battery which can be determined by the computation unit 62, and a signal (e.g., a warning signal of an abnormal state such as "High Temperature") obtained as a result of comparison by the computation unit 62, between the above measurement values and various setting values inputted beforehand to the measurement control unit 50 or fixed values are displayed on a display device (not shown) provided on the frame 20, and transmitted as an external signal to a remote monitoring device, etc.

Further, in the secondary battery system 10 according to the present embodiment, in addition to the two or more module strings 18 and the two or more control devices 48 described above, a secondary battery failure detection system 100 described later is provided.

As shown in FIG. 1, the failure detection system 100 includes a monitoring unit 102 for identifying a module 16 having leakage of at least active material, among the two or more modules 16 provided in the secondary battery system 10, a main gas pipe 104 provided between the two or more modules 16 and the monitoring unit 102, a plurality of auxiliary gas pipes 106 provided in correspondence with the modules 16 (at least one auxiliary gas pipe 106 is attached to each of the modules 16), and a plurality of auxiliary gas pipe solenoid valves SV provided in correspondence with auxiliary gas pipes 106. Each of the auxiliary gas pipe solenoid valves SV is configured to be opened/closed for connection/disconnection between the corresponding auxiliary gas pipe 106 and the main gas pipe 104.

The monitoring unit 102 includes a pump 110 connected to the main gas pipe 104 for sucking a gas supplied into the main gas pipe 104 from the auxiliary gas pipe 106, into the monitoring unit 102, an active material detection sensor 112 ($SO_2$ sensor in this example) for detecting active material contained in a gas flowing through the main gas pipe 104, a drain tank 114 provided upstream of the active material detection sensor 112 for removing at least water content from the gas flowing through the main gas pipe 104 and preventing water condensation at the active material detection sensor 112, a failure module identification unit 116 for identifying modules 16 having leakage of the active material based on the output from the active material detection sensor 112, and a main control unit 120 of a sequence controller 118 for performing opening/closing operation of the plurality of auxiliary gas pipe solenoid valves SV in accordance with a predetermined sequence.

In the present embodiment, two auxiliary gas pipes 106 are attached to each of the modules 16. In the plurality of module strings 18, for example, the module string remotest from the monitoring unit 102 is named as the first module string 18(1), and from this first module string 18(1), the other module strings are named as the second module string 18(2) . . . , the nth module string 18(n) (n=3, 4 . . . ) in the direction toward the monitoring unit 102. It is a matter of course that the module strings may be named as the first module string 18(1), the second module string 18(2), . . . the nth module string 18(n) in the order closest to the monitoring unit 102.

Figure 2A:
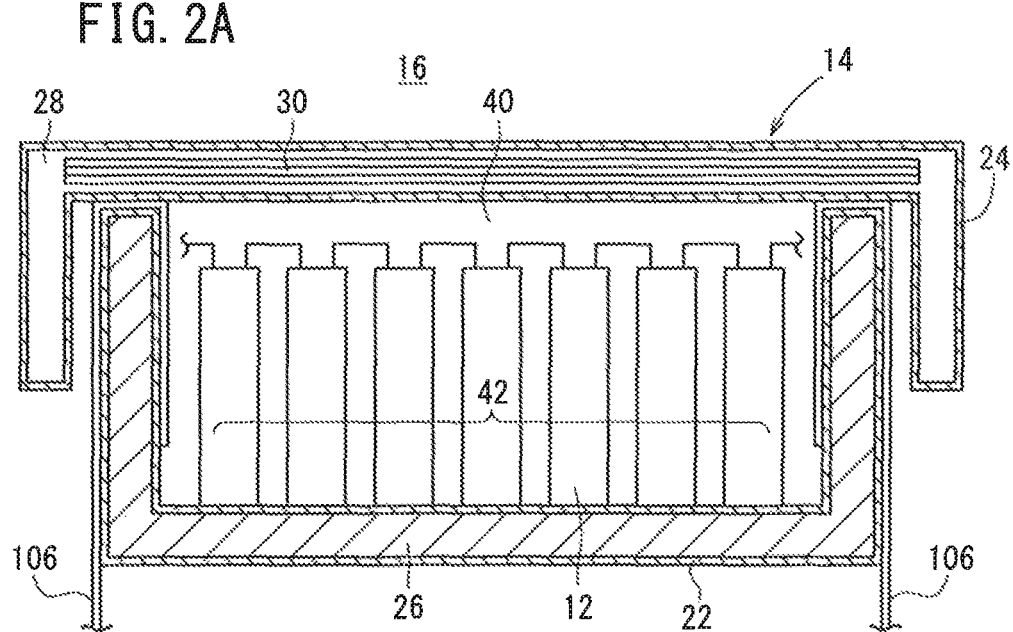
FIG. 2A is a cross sectional view showing structure of a module.
Figure 2B:
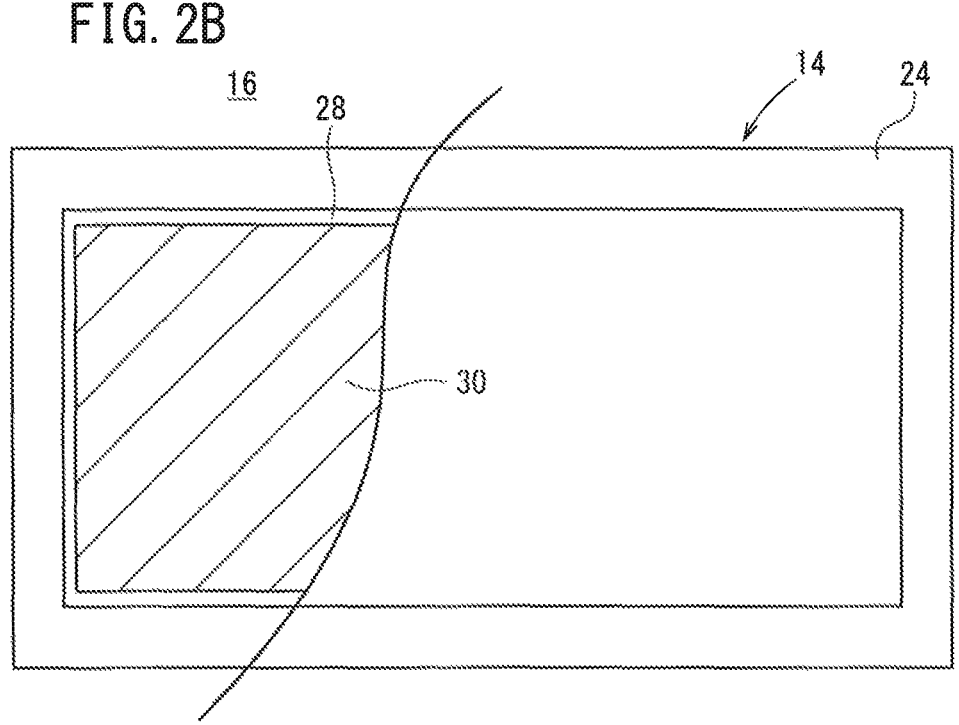
FIG. 2B is a top view partially broken away, showing the structure of the module.

As shown in FIG. 2A, the two auxiliary gas pipes 106 are attached to each of the modules 16, and run outward from base points provided at the bottom of the box body 22 and spaced from each other in the box body 22, such that the battery structural body 42 is located between the base points. The gas containing active material ($SO_2$ gas in this example) is heavier than air (reference gas). Therefore, if the battery cell 12 has leakage of active material, the gas containing the active material is retained at the bottom of the box body 22.

Thus, by positioning the base points (openings) of the auxiliary gas pipes 106 at the bottom of the box body 22, the gas containing the active material can be supplied reliably into the main gas pipe 104 through the auxiliary gas pipes 106.

Further, in the present embodiment, a valve station 122 and a remote control unit 124 are provided in correspondence with each of the module strings 18.

Each of the valve stations 122 includes auxiliary gas pipe solenoid valves SV, and the number of the auxiliary gas pipe solenoid valves SV is the same as the number of auxiliary gas pipes 106. That is, each of the auxiliary gas pipes 106 is connected to the main gas pipe 104 through a corresponding auxiliary gas pipe solenoid valve SV.

The main gas pipe 104 includes a plurality of gas pipes 128 (the first gas pipe 128(1), the second gas pipe 128(2), . . . the nth gas pipe 128(n)), provided in correspondence with the valve stations 122, respectively, and connection pipes 130 connecting the gas pipes 128. Further, main gas pipe solenoid valves MV are connected to terminals of the respective gas pipes 128. Among the main gas pipe solenoid valves MV, a main gas pipe solenoid valve MV1 connected to a terminal of the first gas pipe 128(1) corresponding to the first module string 18(1) is a solenoid valve for supplying a reference gas (external air) into the first gas pipe 128(1). Each of the main gas pipe solenoid valves MV connected to the terminal of each of the other gas pipes 128 is a solenoid valve for supplying the gas from the previous gas pipe 128 to the current gas pipe 128. Further, a solenoid valve HV is connected between the nth gas pipe 128(n) and the drain tank 114 for supplying the gas from the main gas pipe 104 into the monitoring unit 102.

Each of the remote control units 124 controls opening/closing operation of the plurality of auxiliary gas pipe solenoid valves SV and the main gas pipe solenoid valve MV of the corresponding valve station 122 based on an instruction signal from the main control unit 120. It should be noted that the opening/closing operation of the solenoid valve HV is controlled by the remote control unit 124 of the nth module string 18(n) based on an instruction signal from the main control unit 120.

Each of the remote control units 124 opens the plurality of auxiliary gas pipe solenoid valves SV of the corresponding valve station 122 by turns such that each of the auxiliary gas pipe solenoid valves SV is opened for a fixed period for allowing the gas from different auxiliary gas pipes 106 to be supplied into the main gas pipe 104 by turns, respectively.

Next, switching control of the auxiliary gas pipe solenoid valves SV by each remote control unit 124 will be described with reference to a time chart in FIG. 7.

Firstly, the remote control unit 124 opens the first auxiliary gas pipe solenoid valve SV1 based on an input of the failure detection instruction signal Sa from the main control unit 120 to supply the gas from the module 16 corresponding to the first auxiliary gas pipe 106 into the main gas pipe 104. After the elapse of a predetermined period Ta, the remote control unit 124 opens the second auxiliary gas pipe solenoid valve SV2 to supply the gas from module 16 corresponding to the second auxiliary gas pipe 106 into the main gas pipe 104. After the elapse of a fixed period Tb (Tb>Ta) from the time point when the first auxiliary gas pipe solenoid valve SV1 was opened, the first auxiliary gas pipe solenoid valve SV1 is closed. Therefore, both of the two auxiliary gas pipe solenoid valves SV1 and SV2 are opened for a fixed period Tc from opening of the second auxiliary gas pipe solenoid valve SV2 to closing of the first auxiliary gas pipe solenoid valve SV1. This means that, when the second auxiliary gas pipe solenoid valve SV2 is opened after the first auxiliary gas pipe solenoid valve SV1 is closed, an excessive load is exerted on the pump 110, and excessive electric current flows through the pump 110. If switching operation of the auxiliary gas pipe solenoid valve SV is performed many times, an additional load is exerted on the pump 110 to cause a failure in the pump 110. Therefore, a plurality of the auxiliary solenoid valves SV are opened over the fixed period Tc, and opening or closing of the auxiliary solenoid valves SV is switched successively. In this manner, the load on the pump 110 is reduced advantageously. Further, since the auxiliary gas pipe solenoid valves SV are opened by turns with a certain degree of time shift (predetermined period Ta), in association with operation of sucking the gas by the pump 110, the gas is supplied into the main gas pipe 104 in the order the auxiliary gas pipe solenoid valves SV are opened, and then, the gas reaches the active material detection sensor 112.

After the elapse of the predetermined period Ta from opening of the second auxiliary gas pipe solenoid valve SV2, the third auxiliary gas pipe solenoid valve SV3 is opened to supply the gas from the module 16 corresponding to the third auxiliary gas pipe 106 into the main gas pipe 104. Thereafter, in the same manner, the plurality of auxiliary gas pipe solenoid valves SV of the valve station 122 are opened by turns, and each of the auxiliary gas pipe solenoid valves SV is opened for the fixed period Ta to supply the gas from different auxiliary gas pipes 106 into the main gas pipe 104 by turns. Then, when the eighth auxiliary gas pipe solenoid valve SV8 is closed, a cycle completion signal Sb is outputted.

This time, based on the input of the cycle completion signal Sb from the remote control unit 124, the main control unit 120 outputs a failure detection instruction signal Sa to the next remote control unit 124. In the same manner as described above, based on the failure detection instruction signal Sa from the main control unit 120, the next remote control unit 124 opens the plurality of auxiliary gas pipe solenoid valves SV of the valve station 122 by turns, and each of the auxiliary gas pipe solenoid valves SV is opened for the fixed period Ta to supply the gas from different auxiliary gas pipes 106 into the main gas pipe 104 by turns.

Figure 7:
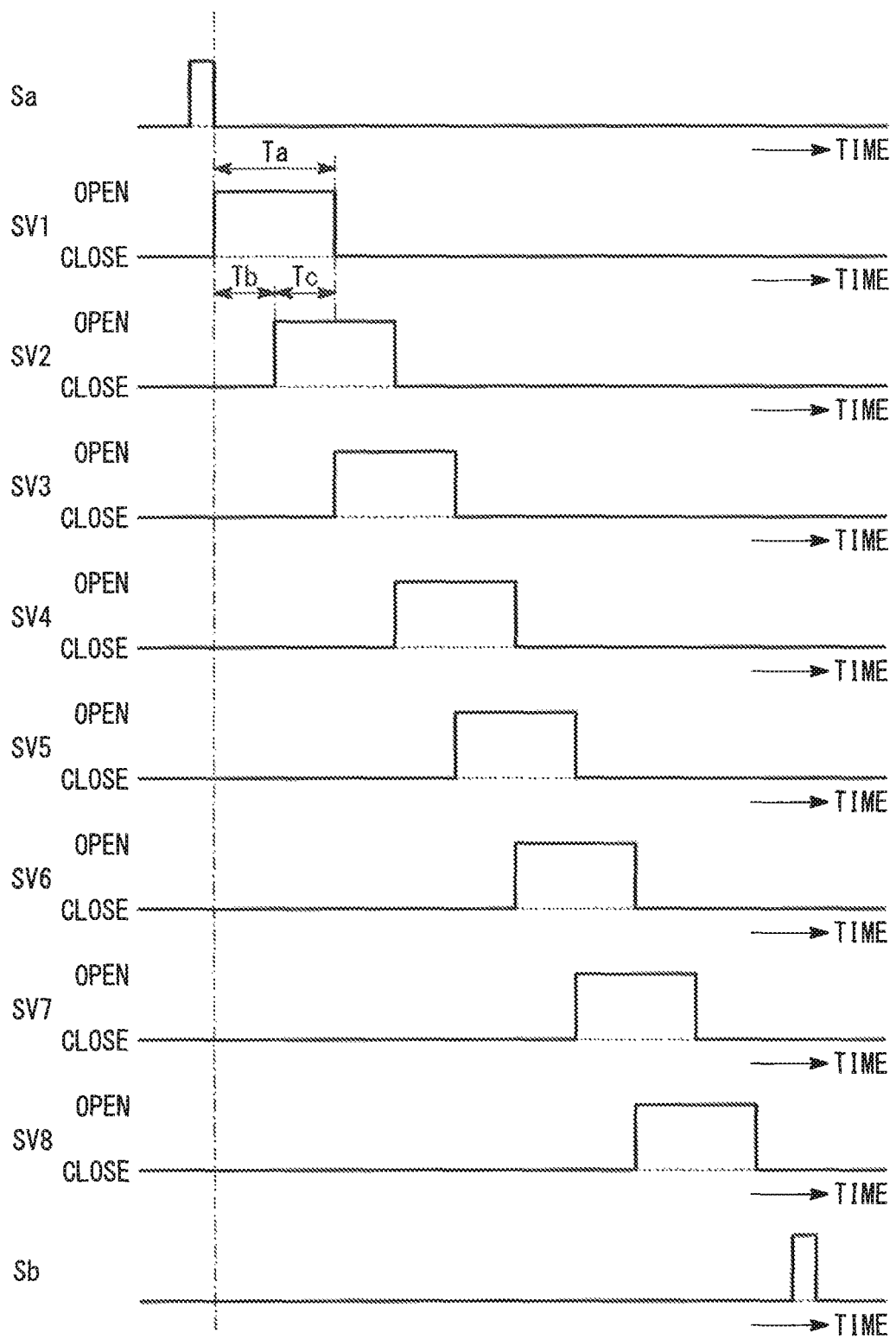
FIG. 7 is a time chart showing switching operation (opening/closing operation) of auxiliary gas pipe solenoid valves.

In the example of FIG. 7, two auxiliary gas pipe solenoid valves SV are opened at the same time. Alternatively, three or more gas pipe solenoid valves SV may be opened at the same time.

In the meanwhile, based on the switch timing of opening the plurality of auxiliary gas pipe solenoid valves SV, the failure module identification unit 116 samples the output from the active material detection sensor 112 to obtain a detection value for each of the auxiliary gas pipes 106. In practice, since a plurality of valve stations 122 are connected to one main gas pipe 104, each of the valve stations 122 has different delay time required for the gas supplied into the main gas pipe 104 from the valve station 122, to reach the active material detection sensor 112. Therefore, the failure module identification unit 116 performs the above-described sampling operation in consideration of the delay time of each of the valve stations 122.

Then, the failure module identification unit 116 identifies a module 16 having attached thereto an auxiliary gas pipe 106 corresponding to a detection value equal to or greater than a predetermined specified value, among detection values corresponding to all of the auxiliary gas pipes 106, as the module 16 having leakage of active material.

Alternatively, the failure module identification unit 116 extracts one detection value from detection values corresponding to all of the auxiliary gas pipes 106, compares the extracted detection value with the other detection values to calculate deviation, and if the deviation falls out of a predetermined range, the failure module identification unit 116 identifies modules 16 having attached thereto auxiliary gas pipes 106 corresponding to high detection values among the compared detection values, as modules 16 having leakage of active material by turns.

Next, an example of operation of the failure detection system 100 will be described with reference to FIGS. 8 to 10.

Firstly, operation of the main control unit 120 of the sequence controller 118 will be described with reference to a flow chart of FIG. 8

Figure 8:
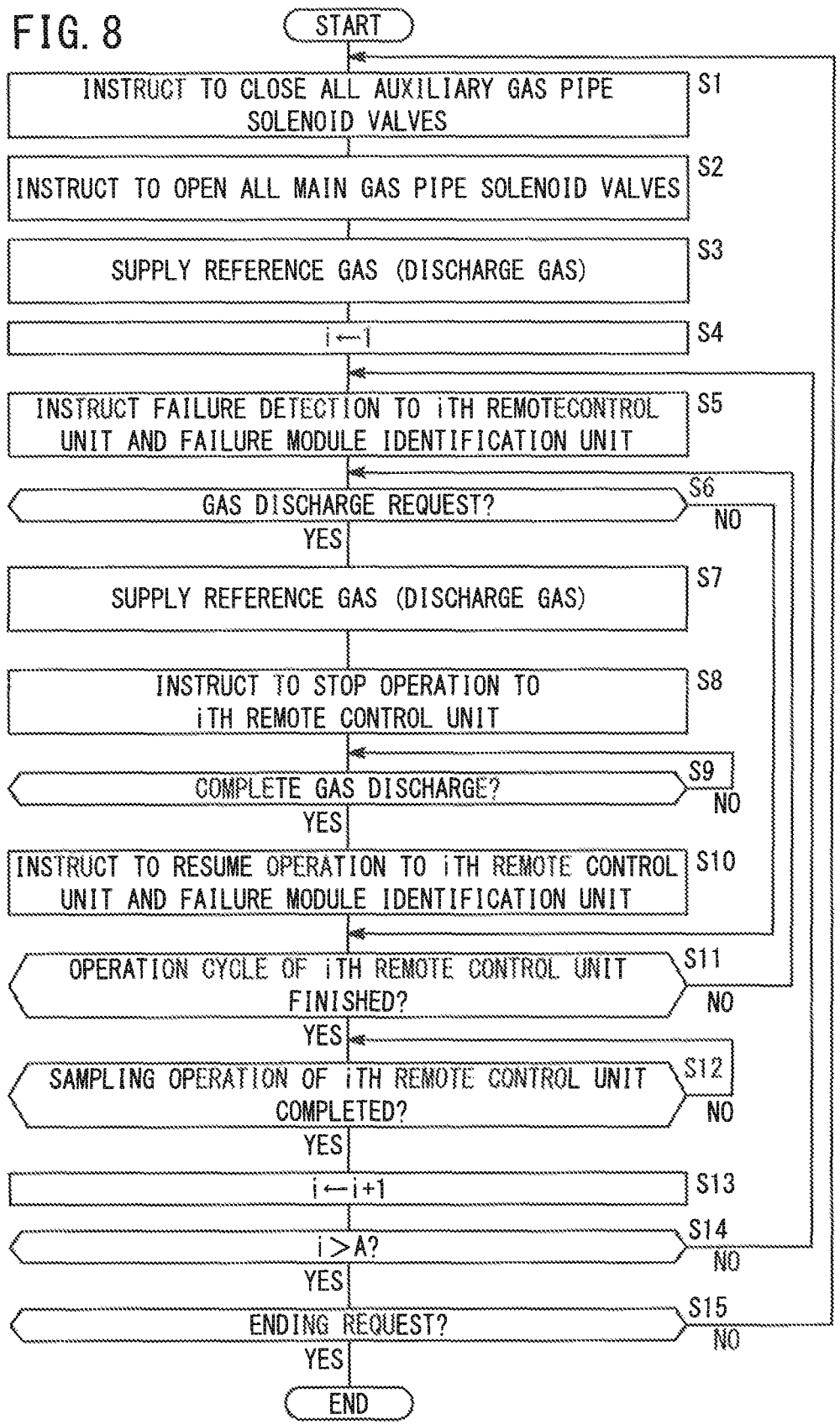
FIG. 8 is a flow chart showing operation of a main control unit of a sequence controller.

Initially, in steps S1 to S3 of FIG. 8, initial operation is performed. That is, in step S1, a valve closing instruction signal for closing the auxiliary gas pipe solenoid values SV is outputted to all of the remote control units 124. Based on the input of the valve closing instruction signal, all of the remote control units 124 close all of the auxiliary gas pipe solenoid valves SV. In step S2, an instruction signal for opening the main gas pipe solenoid valve MV is outputted to all of the remote control units 124. Based on the input of the instruction signal, all of the remote control units 124 open all of the main gas pipe solenoid valves MV. In step S3, operation of the pump 110 is started. Thus, the external reference gas (air) flows into the main gas pipe 104 through the main gas pipe solenoid valves MV, and the reference gas is discharged by the pump 110.

Next, in step S4, the value of a counter i is initialized to "1". Then, in step S5, an instruction signal for failure detection (failure detection instruction signal Sa: see FIG. 7) is outputted to the ith remote control unit 124 and the failure module identification unit 116. Based on the input of the failure detection instruction signal Sa, the ith remote control unit 124 opens the plurality of auxiliary gas pipe solenoid valves SV of the corresponding valve station 122 by turns, and each of the auxiliary gas pipe solenoid valves SV is opened for the fixed period Ta (see FIG. 7) to supply the gas from different auxiliary gas pipes 106 into the main gas pipe 104 by turns. This process will be described later in detail. Based on the input of the failure detection instruction signal Sa, the failure module identification unit 116 starts sampling of the detection value from the active material detection sensor 112. This process will also be described later in detail.

In step S6, it is determined whether there is a request to discharge the gas, from the failure module identification unit 116. In the case where the gas (e.g., $SO_2$ gas) containing active material from a certain module 16 is supplied into the main gas pipe 104, and detected by the active material detection sensor 112, if concentration of the $SO_2$ gas is high, the gas is diffused to the entire main gas pipe 104, and the gas diffusion may cause problems in the subsequent detection of the $SO_2$ gas performed for each of the modules 16. Therefore, in the case where the sampled detection value is equal to or greater than a gas discharge request setting value, i.e., in the case where it is required to discharge the gas from the main gas pipe 104, the failure module identification unit 116 outputs a gas discharge request signal to the main control unit 120, and waits for an input of a resuming instruction signal described later. The gas discharge request signal includes information (number of sampling operations) of the auxiliary gas pipe solenoid valves SV having detection values equal to or greater than the gas discharge request setting value. For example, information of the auxiliary gas pipe solenoid valves SV may include the number of sampling operations which have been performed up to this time point (sampling number) in the ith module string 18.

In the above described determination of the gas discharge request, the detection value and the gas discharge request setting value are compared. In an alternative method, preferably, a mean value may be determined successively from sampled data (detection values) in the past, and when it is detected that the mean value is equal to or greater than $+1\sigma$ (standard deviation), a gas discharge request signal may be outputted. That is, it is preferable not to carry out gas discharging in the event of insignificant measurement errors possibly within a range of $\pm 1\sigma$. Gas discharging should be performed when the measurement error falls out of the range of $\pm 1\sigma$. In this case, the gas discharge request signal includes information of the auxiliary solenoid valves SV (number of sampling operations) when the mean value reaches $+1\sigma$ (standard deviation) or more.

In step S6, in the case where it is determined that there is a gas discharge request, the routine proceeds to the next step S7 to output an instruction signal (reference gas supply instruction signal) for providing an instruction to supply a reference gas to a remote control unit 124 controlling the main gas pipe solenoid valve MV capable of supplying a reference gas from the outside to the main gas pipe 104 (remote control unit 124 remotest from the monitoring unit 102 in this example). Based on the input of the reference gas supply instruction signal, the remote control unit 124 opens the corresponding main gas pipe solenoid valve MV to supply the reference gas into the main gas pipe 104. Then, in step S8, a stop instruction signal for stopping opening operation of the auxiliary gas pipe solenoid valve SV is outputted to the ith remote control unit 124. Based on the input of the stop instruction signal, the ith remote control unit 124 closes the auxiliary gas pipe solenoid valve SV in the opened state. That is, the ith remote control unit 124 suspends operation of opening the plurality of auxiliary gas pipe solenoid valve SV by turns, and closes all of the auxiliary gas pipe solenoid valves SV.

In step S9, it is determined whether or not gas discharge has been completed. This determination can be made, e.g., based on whether or not predetermined time required for gas discharging has elapsed, or whether or not fluctuation of the detection value from the active material detection sensor 112 has almost been finished.

Upon completion of gas discharge, the routine proceeds to the next step S10 to output a resuming instruction signal for failure detection to the ith remote control unit 124 and the failure module identification unit 116. This resuming instruction signal includes information (number of sampling operations) of the auxiliary gas pipe solenoid valves SV included in the gas discharge request signal inputted in step S6. Based on the input of the resuming instruction signal, the ith remote control unit 124 resumes operation of opening the auxiliary gas pipe solenoid valves SV. At this time, the gas is supplied into the main gas pipe 104, from the auxiliary gas pipe 106 next to the auxiliary gas pipe 106 having the detection value equal to or greater than the gas discharge request setting value requiring gas discharge. Alternatively, the gas is supplied into the main gas pipe 104, from the auxiliary gas pipe 106 next to the auxiliary gas pipe 106 having the mean value equal to or greater than $+1\sigma$ (standard deviation).

In step S11, it is determined whether or not a signal indicating completion of the cycle of opening operation of the auxiliary gas pipe solenoid valves SV (cycle completion signal Sb: see FIG. 7) has been inputted from the ith remote control units 124. If the cycle completion signal Sb has not been inputted, the above described processes in step S6 and the subsequent steps are repeated. When the cycle completion signal Sb is inputted, the routine proceeds to the next step S12. This time, the routine waits for an input of a signal indicating completion of the detection values of the ith module string 18 (sampling completion signal) from the failure module identification unit 116. When the sampling completion signal is inputted, the routine proceeds to the next step S13 to increment the value of the counter i by +1.

In step S14, it is determined whether or not the failure detection instruction signal has been outputted to all of the remote control units 124. This determination is made whether or not the value of the counter i has exceeded the number A of the module strings. If the value of the counter i is equal to or less than the number A of the module strings, the above described processes in step S5 and the subsequent steps are repeated. If the value of the counter i is greater than the number A of the module strings, the routine proceeds to the next step S15 to determine whether or not an ending request (disconnection of power supply, maintenance request, etc.) has been made to the main control unit 120. If no ending request has been made, the above described processes in step S1 and the subsequent steps are repeated. When an ending request is made, operation of the main control unit 120 is finished.

Next, operation of the remote control unit 124 of the sequence controller 118, in particular, operation of supplying the gas from the auxiliary gas pipes 106 to the main gas pipe 104 by turns will be described with reference to a flow chart in FIG. 9. Therefore, description regarding operation corresponding to initial operation of the main control unit 120 will be omitted.

Figure 9:
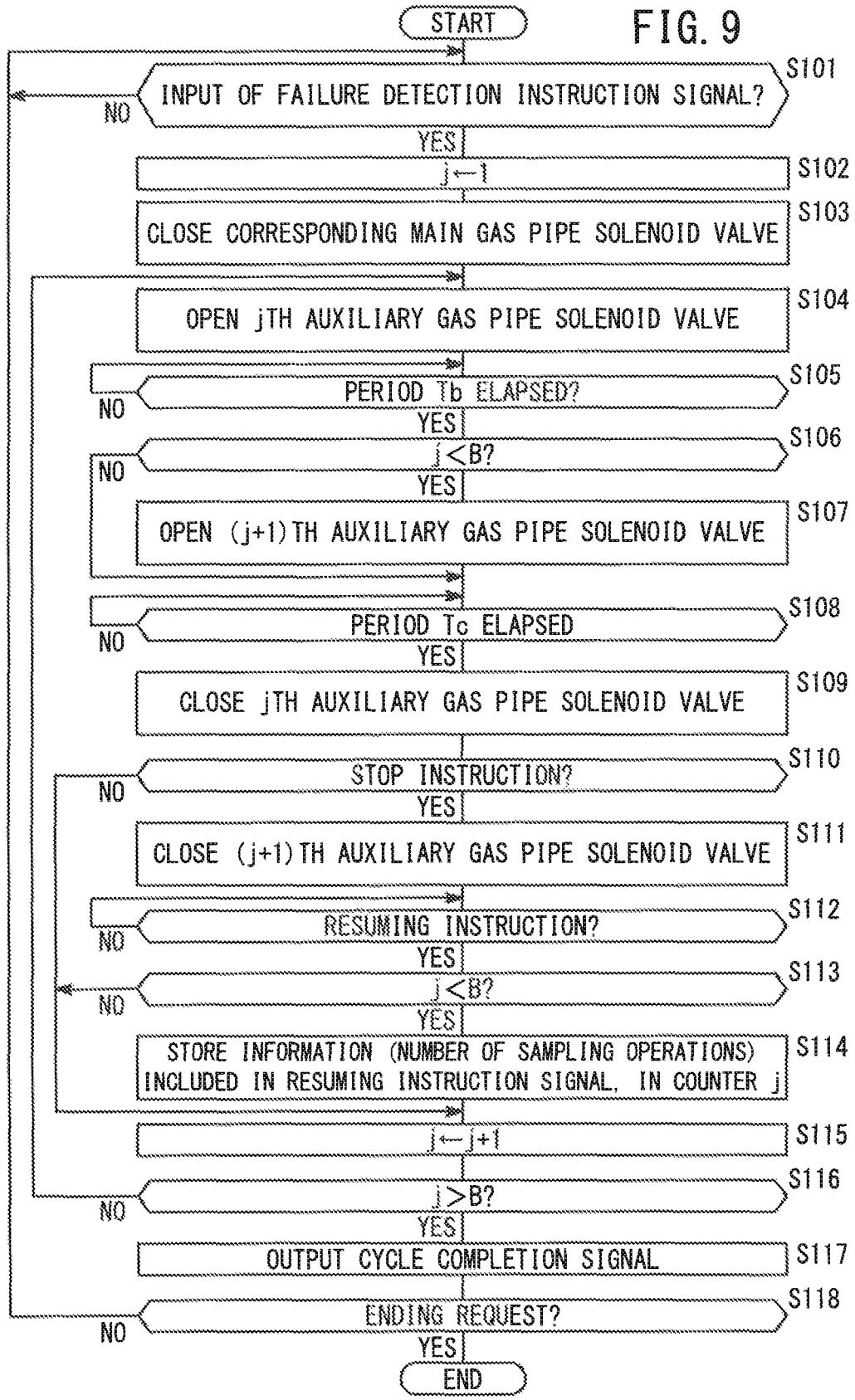
FIG. 9 is a flow chart showing operation of a remote control unit of a sequence controller, in particular, operation of supplying a gas from auxiliary gas pipes to a main gas pipe by turns.

Firstly, in step S101 of FIG. 9, the routine waits for an input of the failure detection instruction signal Sa from the main control unit 120. When the failure detection instruction signal Sa is inputted, the routine proceeds to the next step S102 to store an initial value "1" in a counter j. Thereafter, in step S103, the corresponding main gas pipe solenoid valve MV is closed.

In step S104, the jth auxiliary gas pipe solenoid valve SV is opened to supply the gas (atmosphere) of the module 16 corresponding to the jth auxiliary gas pipe 106 into the main gas pipe 104. Then, in step S105, the routine waits for the elapse of the period Tb (see FIG. 7). After the elapse of the period Tb, the routine proceeds to step S106 to determine whether or not the value of the counter j is less than the number B of the auxiliary gas pipes 106 (j<B). If the value of the counter j is less than the number B, the routine proceeds to step S107 to open the (j+1)th auxiliary gas pipe solenoid valve SV for supplying the gas (atmosphere) of the module 16 corresponding to the (j+1)th auxiliary gas pipe 106 into the main gas pipe 104.

In step S106, if it is determined that the value of the counter j is the same as the number B of the auxiliary gas pipes 106 or when the process in the above step S107 is finished, the routine proceeds to the next step S108 to wait for the elapse of the period Tc (elapse of the period Ta after opening of the jth auxiliary solenoid valve SV: see FIG. 7). After the elapse of the period Tc, the routine proceeds to step S109 to close the jth auxiliary gas pipe solenoid valve SV.

In the next step S110, it is determined whether or not a stop instruction signal has been inputted from the main control unit 120. If the stop instruction signal has been inputted, the routine proceeds to step S111 to close the (j+1)th auxiliary gas pipe solenoid valve SV in the open state. Thereafter, in step S112, the routine waits for an input of the resuming instruction signal from the main control unit 120. When the resuming instruction signal is inputted, the routine proceeds to the next step S113 to determine whether or not a value of the counter j is less than the number B of the auxiliary gas pipes 106 (j<B). If the value of the counter j is less than the number B, the routine proceeds to step S114 to collect information included in the resuming instruction signal (information of the auxiliary gas pipes having detection values equal to or greater than a specified value (the number of sampling operations)), and store the information in the counter j.

In the above step S110, if it is determined that the stop instruction signal has not been inputted, or in the above step S113, if it is determined that the value of the counter j is equal to the number B, or when the process in the above step S114 is finished, the routine proceeds to next step S115 to increment the value of the counter j by +1.

In step S116, it is determined whether or not opening operation of all of the auxiliary gas pipe solenoid valves SV under the control of the remote control unit 124 has been finished. This determination is made based on whether or not the value of the counter j has exceeded the number B of the auxiliary gas pipes 106. If the value of the counter j is equal to or less than the number B, the above described processes in step S104 and the subsequent steps are repeated. If the value of the counter j exceeds the number B of the auxiliary conduit valves, the routine proceeds to step S117 to output the cycle completion signal Sb to the main control unit 120.

Thereafter, in step S118, it is determined whether or not a request to stop operation of the remote control unit 124 (disconnection of power supply, maintenance request, etc.) has been made. If there is no request to stop operation of the remote control unit 124, the above described processes in step S101 and the subsequent steps are repeated. When a request to stop operation of the remote control unit 124 is made, the process of the remote control unit 124 is finished.

Next, operation of the failure module identification unit 116, in particular, sampling operation will be described with reference to a flow chart in FIG. 10.

Figure 10:
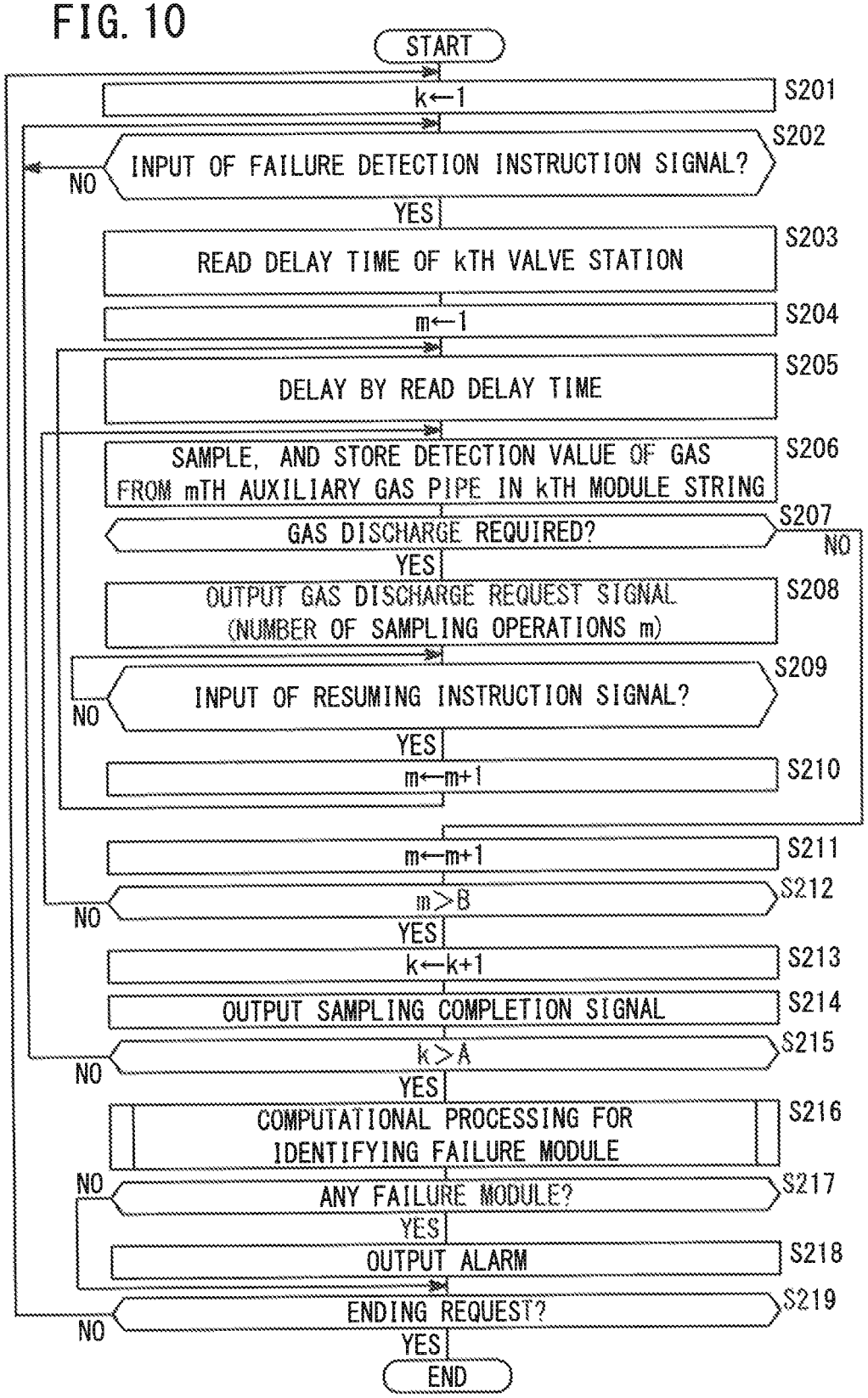
FIG. 10 is a flow chart showing operation, in particular, sampling operation of a failure module identification unit.

Firstly, in step S201 of FIG. 10, the value of a counter k is set to an initial value "1". Thereafter, in step S202, the routine waits for an input of the failure detection instruction signal Sa from the main control unit 120. When the failure detection instruction signal Sa is inputted, the routine proceeds to the next step S203, and information about the time (delay time) required for the gas from the kth valve station 122 to reach the active material detection sensor 112 is read from an information table.

In step S204, the value of a counter m is set to an initial value "1". Then, in step S205, the routine delays the process by the read delay time. Then, in step S206, the output from the active material detection sensor 112 is sampled as a detection value of the gas from the mth auxiliary gas pipe 106 in the kth module string 18, and the detection value is stored in a predetermined memory area of a memory by turns.

In step S207, it is determined whether or not gas discharge is required. Specifically, it is determined whether or not the detection value obtained by current sampling is equal to or greater than a setting value C requiring gas discharge, or whether or not the mean value successively determined from the historical sampling data (detection values) is equal to or greater than +1σ (standard deviation). If the detection value is equal to or greater than the setting value C, or if the mean value is equal to or greater than +1σ (standard deviation), $SO_2$ gas having high concentration is distributed to the entire main gas pipe 104, and diffusion of the $SO_2$ gas causes degradation in the detection accuracy of the active material detection sensor 112 thereafter. Thus, in step S208, the gas discharge request signal is outputted to the main control unit 120. This gas discharge request signal includes information (the number of sampling operations) of the auxiliary gas pipes 106 having detection values equal to or greater than the setting value C, or information (the number of sampling operations) of the auxiliary gas pipe solenoid valve SV at the time point when the mean value becomes equal to or greater than +1σ (standard deviation).

In step S209, the routine waits for an input of the resuming instruction signal from the main control unit 120. That is, the routine waits for completion of the gas discharging process in the main gas pipe 104. When the resuming instruction signal is inputted, the routine proceeds to the next step S210 to increment the value of the counter m by +1. Thereafter, the above processes in step S205 and the subsequent steps are repeated. This is because, by resuming of the operation, the gas is supplied again into the main gas pipe 104 through the (m+1)th auxiliary pipe solenoid valve SV of the kth valve station 122, and in step S205, again, a delay by predetermined time needs to be introduced.

In step S207, if it is determined that the detection value obtained by sampling this time is less than the setting value C, the routine proceeds to the next step S211 to increment the value of the counter m by +1.

In step S212, it is determined whether or not sampling of the gas from all of the auxiliary gas pipes 106 in the kth module string 18 has been finished. This determination is made based on whether or not the value of the counter m has exceeded the number B of the auxiliary gas pipes 106. If the value of the counter m is equal to or less than the number B, the above described processes in step S206 and the subsequent steps are repeated. If the value of the counter m has exceeded the number B, the routine proceeds to the next step S213 to increment the value of the counter k by +1. Then, in step S214, a sampling completion signal is outputted to the main control unit 120.

In step S215, it is determined whether or not sampling of all of the module strings 18 (i.e., all the modules 16) has been finished. This determination is made based on whether the value of the counter k has exceeded the number A of the module strings. If the value of the counter k is equal to or less than the number A of the module strings, the above described processes in step S202 and the subsequent steps are repeated. If the value of the counter m is greater than the number A of the module strings, the routine proceeds to the next steps S216 to perform computation for identifying the module 16 having a failure based on detection values stored in the memory.

This computation is performed by identifying a module 16 having attached thereto an auxiliary gas pipe 106 corresponding to a detection value equal to or greater than a predetermined specified value D, among the detection values corresponding to all of the auxiliary gas pipes 106, as a module 16 having leakage of active material.

Alternatively, among the detection values corresponding to all of the auxiliary gas pipes 106, one detection value is extracted. The extracted detection value is compared with other detection values to calculate a deviation, and if the deviation falls out of a predetermined range, modules 16 having attached thereto auxiliary gas pipes 106 corresponding to high detection values among the compared detection values, are identified as modules 16 having leakage of active material by turns.

When computation in step S216 is finished, the routine proceeds to the next step S217 to determine whether or not there is any module 16 having a failure (failure module 16). If there is any failure module 16, the routine proceeds to the next step S218 to output an alarm indicating detection of the failure module 16. Alarming may be performed by displaying a number of the failure module 16 or a message to prompt an operator to prepare for stopping operation of the failure module 16 on a monitor of a remote monitoring device, or outputting sounds.

In step S219, it is determined whether or not an ending request (disconnection of power supply, maintenance request, etc.) has been made to the failure module identification unit 116. If no ending request has been made, the above described processes in step S201 and the subsequent steps are repeated. When an ending request is made, operation of the failure module identification unit 116 is finished.

As described above, in the present embodiment, the sequence controller 118 (the main control unit 120 and the remote control unit 124) performs open/close operation of the plurality of auxiliary gas pipe solenoid valves SV in accordance with the predetermined sequence. Therefore, the gas (atmosphere) in the casings 14 of the plurality of modules 16 is supplied into the main gas pipe 104 through the auxiliary gas pipes 106 and the auxiliary gas pipe solenoid valves SV. The gas supplied into the main gas pipe 104 is sucked into the monitoring unit 102 by the pump 110. The active material detection sensor 112 detects active material included in the gas flowing through the main gas pipe 104. Then, the failure module identification unit 116 identifies the module 16 having leakage of active material based on the output from the active material detection sensor 112. That is, in the system according to the present embodiment, using a scheme which is different from the scheme of detecting voltage changes, the gas (atmosphere) in the casings 14 from the plurality of modules 16 is collected to detect active material in the gas. In this manner, it is possible to easily identify the module 16 having leakage of active material.

Figure 11:
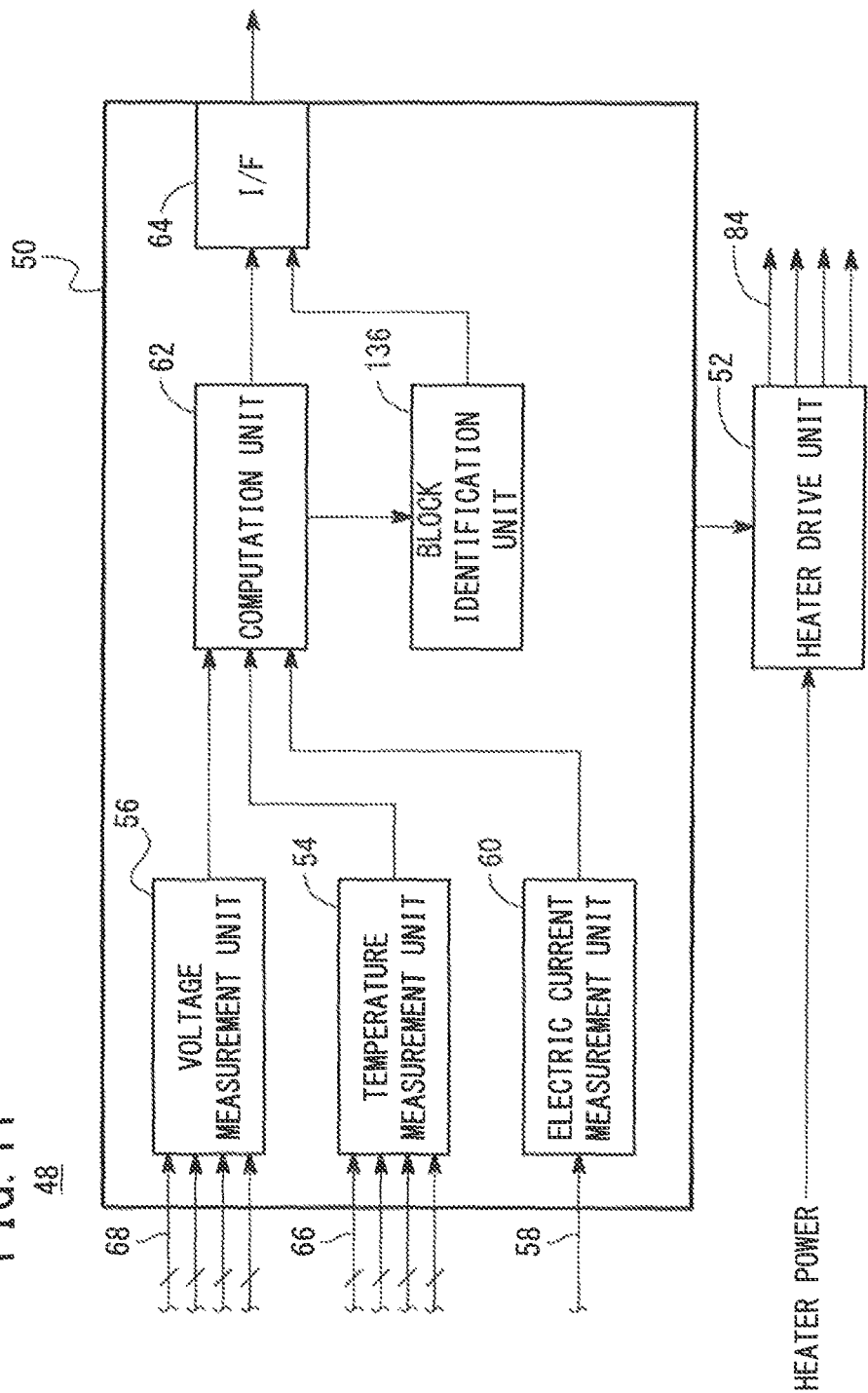
FIG. 11 is a block diagram shown structure of a control device of a failure detection system according to a modified embodiment.
Figure 12:
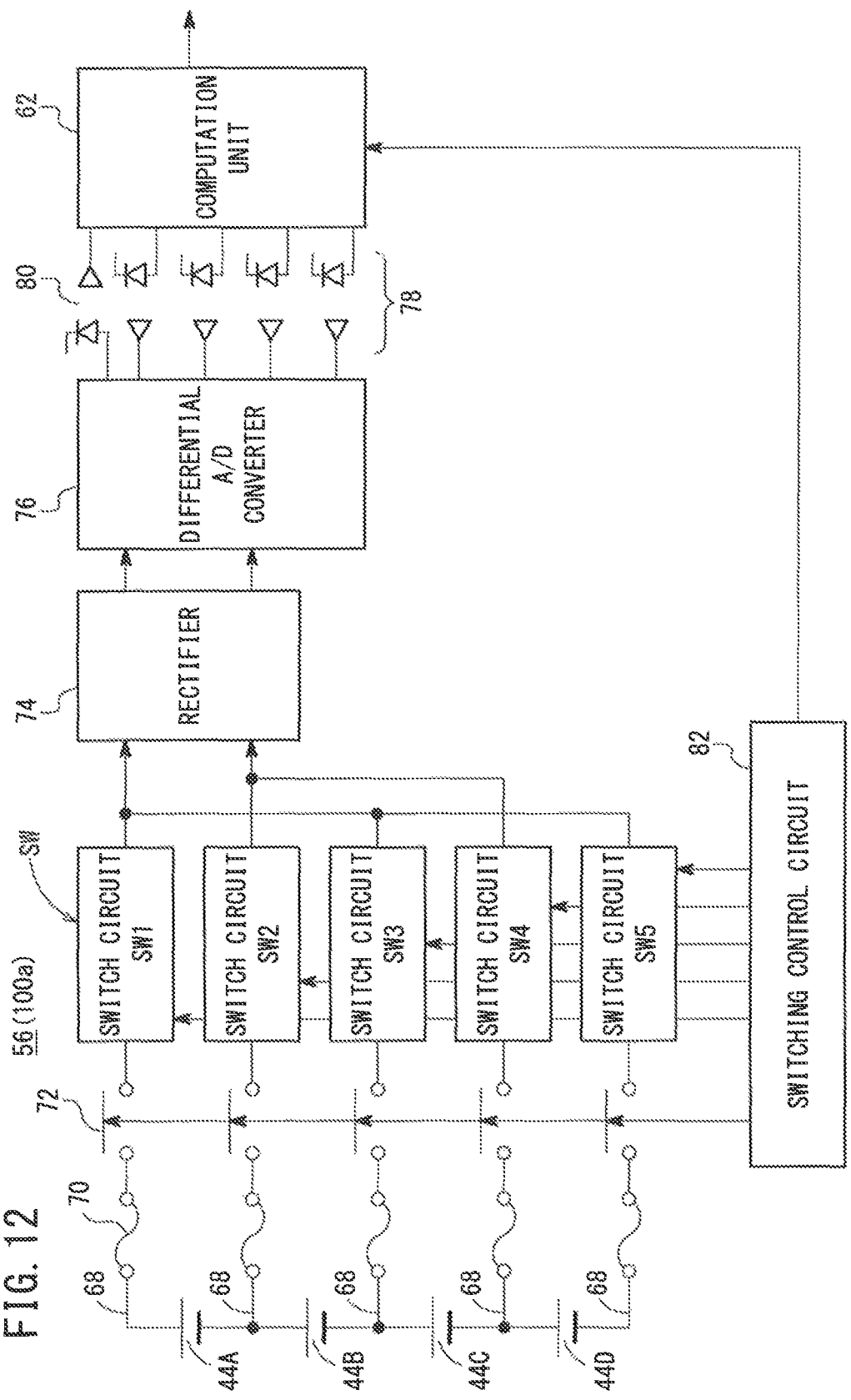
FIG. 12 is a block diagram showing structure of a voltage measurement unit of the failure detection system according to the modified embodiment.

Next, a modified embodiment of the failure detection system 100 will be described with reference to FIGS. 11 and 12. A failure detection system 100a according to the modified embodiment has substantially the same structure as that of the above described failure detection system 100. As shown in FIG. 11, however, the failure detection system 100a according to the modified embodiment has a block identification unit 136 in a measurement control unit 50 of a control device 48 provided in correspondence with each of the module strings 18, and as shown in FIG. 12, the differential A/D converter 76 has 16 bit resolution to improve accuracy. In this respect, the failure detection system 100a according to the modified embodiment is different from the failure detection system 100.

The block identification unit 136 detects open circuit voltage values of all the blocks 44 in the corresponding module strings 18 at the end of electric discharging, and identifies a block 44 having a failure based on the detected open circuit voltage values. For example, assuming that one battery cell 12 included in a certain block 44 has external short-circuit or internal short-circuit, additional loads are applied to the other battery cells 12 of the block 44, and the open circuit voltage value of each of the battery cells 12 at the end of electric discharging becomes closer to the open circuit voltage value at the limit (e.g., 1.82 V). Consequently, the open circuit voltage value at the end of electric discharging in the block 44 is decreased. Therefore, open circuit voltage values of two or more normal blocks 44 at the end of electric discharging are determined beforehand, e.g., empirically. Among the open circuit values, for example, an arbitral voltage value between the lowest open circuit value and the limit value is determined as a specified voltage value. For example, the limit value may include voltage applied between both terminals of the block 44 assuming that all of the battery cells 12 included in the block 44 have an open circuit voltage value at the limit (e.g., 1.82 V).

Then, the block identification unit 136 identifies a block 44 corresponding to an open circuit voltage value equal to or less than the predetermined specified voltage value, among the detected open circuit voltage values, as a block 44 having a failure.

Alternatively, among the detected open circuit detection values, one detection value is extracted. The extracted open circuit voltage value is compared with other open circuit voltage value to calculate deviation, and if the deviation falls out of a predetermined range, among the compared voltage values, the blocks 44 corresponding to low voltage values are identified as blocks 44 having failures by turns. For this purpose, open circuit voltage values of two or more normal blocks at the end of electric discharging are determined beforehand, empirically, and among the open circuit voltage values, arbitral values can be used for the predetermined range. For example, the predetermined range is between the deviation of the highest open circuit voltage value and the lowest open circuit voltage value +0.1 V and the deviation of the highest open circuit voltage value and the lowest open circuit voltage value +1.0 V.

Items of information of the block 44 identified by each block identification unit 136 (ID number, block number, etc.) are transmitted through the monitoring unit 102 through the interface 64.

The failure module identification unit 116 of the monitoring unit 102 receives information of the block transmitted from the block identification unit 136 of each control device 48, and identifies a module 16 having a failure with reference to a correspondence table stored in a memory (not shown). For example, the correspondence table includes a table or the like storing information (ID number, module number, etc.) of the module 16 corresponding to the ID number and the block number of the block 44.

The failure detection system 100*a* according to this modified embedment adopts the scheme of identifying the module having leakage of active material easily by collecting the gas (atmosphere) in the casing 14 of each of the above described plurality of modules 16 to detect active material in the gas. Additionally, the failure detection system 100*a* according to this modified embodiment can identify the module 16 including the battery cell 12 having internal short-circuit or external short-circuit based on the highly accurate voltage value for each block. Therefore, the module 16 having a failure can be identified with the high degree of accuracy.

It is a matter of course that the secondary battery system and the secondary battery failure detection system according to the present invention is not limited to the embodiments described above, and various structure can be adopted without deviating the gist of the present invention.

The invention claimed is:

1. A secondary battery system comprising:
    two or more modules including a large number of battery cells as secondary batteries and a casing containing the battery cells;
    a monitoring unit configured to identify a module having leakage of at least active material, among the two or more modules;
    a main gas pipe provided between the two or more modules and the monitoring unit;
    a plurality of auxiliary gas pipes provided in correspondence with the modules, at least one of the auxiliary gas pipes being attached to each of the modules;
    a plurality of solenoid valves provided in correspondence with the auxiliary gas pipes, the solenoid valves being configured to be opened/closed for connection/disconnection between the corresponding auxiliary gas pipes and the main gas pipe,
    wherein the monitoring unit includes:
    a pump connected to the main gas pipe and configured to suck a gas supplied into the main gas pipe from the auxiliary gas pipe, into the monitoring unit;
    an active material detection sensor configured to detect active material contained in a gas flowing through the main gas pipe;
    a failure module identification unit configured to identify a module having leakage of active material based on an output from the active material detection sensor; and
    a sequence controller configured to perform opening/closing operation of the plurality of solenoid valves in accordance with a predetermined sequence.

2. The secondary battery system according to claim 1, wherein the sequence controller opens the plurality of solenoid valves by turns such that each of the solenoid valves is opened for a fixed period for allowing the gas from different auxiliary gas pipes to be supplied into the main gas pipe by turns, respectively; and
    the failure module identification unit samples the output from the active material detection sensor to obtain a detection value for each of the auxiliary gas pipes, based on switch timing of opening operation of the solenoid valves.

3. The secondary battery system according to claim 2, wherein when the failure module identification unit detects that the sampled detection value is equal to or greater than a gas discharge request setting value requiring gas discharge, or when the failure module identification unit determines a mean value sequentially from detection values of historical sampling and detects that the mean value is equal to or greater than +1σ, which is standard deviation, the sequence controller performs the steps of:
    (1) suspending operation of opening the solenoid valves by turns and closing all of the solenoid valves;
    (2) supplying a reference gas into the main gas pipe to discharge the gas in the main gas pipe; and
    (3) resuming operation of opening the solenoid valves by turns.

4. The secondary battery system according to claim 2, wherein the failure module identification unit identifies a module having attached thereto an auxiliary gas pipe corresponding to a detection value equal to or greater than a predetermined specified value, among detection values corresponding to all of the auxiliary gas pipes, as a module having leakage of active material.

5. The secondary battery system according to claim 2, wherein the failure module identification unit extracts one detection value from detection values corresponding to all of the auxiliary gas pipes, compares the extracted detection value with the other detection values to calculate deviation, and if the deviation falls out of a predetermined range, identifies modules having attached thereto auxiliary gas pipes corresponding to high detection values, among the compared detection values, as modules having leakage of active material by turns.

6. The secondary battery system according to claim 2, wherein the fixed period includes a period in which at least two of the solenoid valves are both opened.

7. The secondary battery system according to claim 1, wherein the monitoring unit includes a drain tank configured to remove at least water content from the gas flowing through the main gas pipe.

8. The secondary battery system according to claim 1, wherein two or more module strings each formed by connecting a predetermined number of the modules in series are provided, a valve station is provided in correspondence with each of the module strings, and the valve station has a number of the solenoid valves corresponding to the predetermined number, and the sequence controller includes:
a main control unit provided for the monitoring unit; and
a remote control unit provided in correspondence with each of the module strings and configured to control the solenoid valves of the corresponding valve station, based on an instruction signal from the main control unit.

9. The secondary battery system according to claim 1, wherein two auxiliary gas pipes are attached to each of the modules.

10. The secondary battery system according to claim 9, wherein the casing of the module includes a box body containing a large number of the battery cells and a lid body covering an opening on an upper surface of the box body; and two auxiliary gas pipes run outward from base points provided at bottom of the box body and spaced from each other in the box body, such that the battery structural body made up of a large number of the battery cells placed in the box body is located between the base points.

11. The secondary battery system according to claim 1, wherein the module is formed by connecting two or more blocks in series;

each of the blocks is formed by connecting two or more circuits in parallel, and each of the circuits is formed by connecting two or more battery cells in series.

12. The secondary battery system according to claim 1, further comprising a block identification unit provided in correspondence with each of the modules, wherein the block identification unit detects open circuit voltage values of all of the blocks in the corresponding module at end of electric discharging, and identifies a block having a failure based on the detected open circuit voltage values; and among the modules, the failure module identification unit identifies a module including the block having the failure, as a module having leakage of active material.

13. The secondary battery system according to claim 12, wherein the block identification unit identifies a block corresponding to an open circuit voltage value equal to or less than a predetermined specified voltage value, as a block having a failure.

14. The secondary battery system according t claim 12, wherein the block identification unit extracts one open circuit voltage value from the detected open circuit voltage values, compares the extracted open circuit voltage value with the other open circuit voltage values to calculate deviation, and when the deviation falls out of a predetermined range, identifies blocks corresponding to low voltage values, among the compared voltage values, as blocks having failures by turns.

15. The secondary battery system according to claim 1, comprising:

two or more module strings each formed by connecting a predetermined number of the modules in series; and
a block identification unit provided in correspondence with each of the module strings, wherein the block identification unit detects open circuit voltage values of all of the blocks in the corresponding module string at end of electric discharging, and identifies a block having a failure based on the detected open circuit voltage values; and among the modules, the failure module identification unit identifies a module including the block having the failure, as a module having leakage of active material.

16. The secondary battery system according to claim 15, wherein the block identification unit identifies a block corresponding to an open circuit voltage value equal to or less than a predetermined specified voltage value, as a block having a failure.

17. The secondary battery system according to claim 15, wherein the block identification unit extracts one open circuit voltage value from the detected open circuit voltage values, compares the extracted open circuit voltage value with the other open circuit voltage values to calculate deviation, and when the deviation falls out of a predetermined range, identifies blocks corresponding to low voltage values, among the compared voltage values, as blocks having failures by turns.

18. A secondary battery failure detection system comprising:

a monitoring unit configured to identify a module having leakage of at least active material, among two or more modules each including a large number of battery cells as secondary batteries and a casing containing the battery cells;
a main gas pipe provided between the two or more modules and the monitoring unit;
a plurality of auxiliary gas pipes provided in correspondence with the modules, at least one auxiliary gas pipe being attached to each of the modules;
a plurality of solenoid valves provided in correspondence with the auxiliary gas pipes, the solenoid valves being configured to be opened/closed for connection/disconnection between the corresponding auxiliary gas pipes and the main gas pipe, wherein the monitoring unit includes:
a pump connected to the main gas pipe and configured to suck a gas supplied into the main gas pipe from the auxiliary gas pipe, into the monitoring unit;
an active material detection sensor configured to detect active material contained in a gas flowing through the main gas pipe;
a failure module identification unit configured to identify a module having leakage of active material based on an output from the active material detection sensor; and
a sequence controller configured to perform opening/closing operation of the solenoid valves in accordance with a predetermined sequence.

* * * * *